Dec. 17, 1968
R. B. JAEGER
3,417,258
MAGNETIC CORE BIPOLAR PULSE DISCRIMINATOR
Filed May 18, 1964
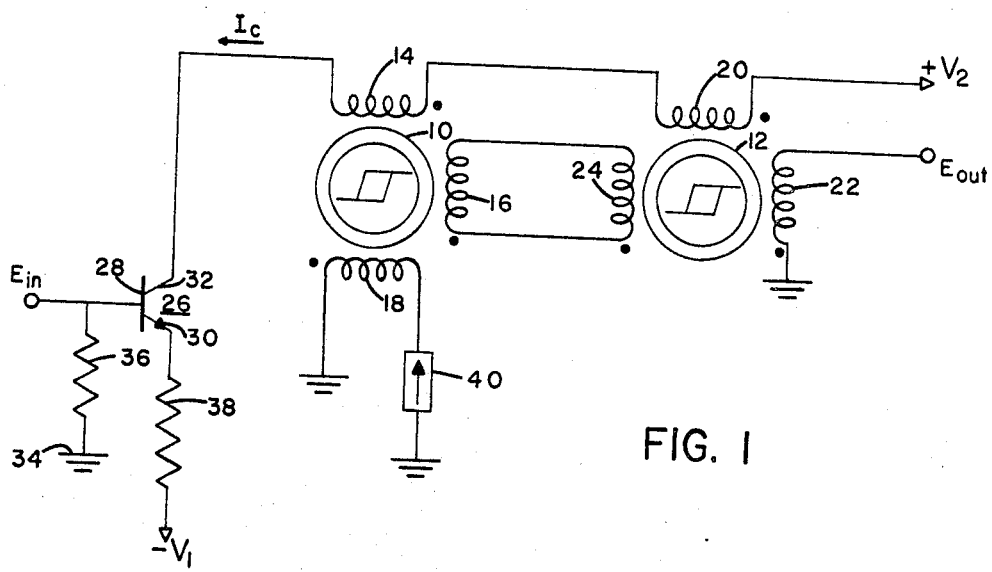
FIG. 1
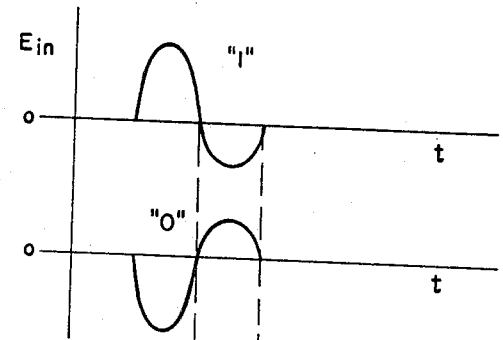
FIG. 2
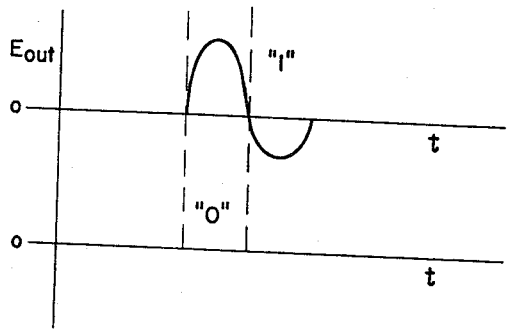
INVENTOR.
ROBERT B. JAEGER
BY Charles J. Ungemach
ATTORNEY

United States Patent Office 3,417,258
Patented Dec. 17, 1968

3,417,258
MAGNETIC CORE BIPOLAR PULSE DISCRIMINATOR
Robert B. Jaeger, St. Petersburg, Fla., assignor to Honeywell Inc., Minneapolis, Minn., a corporation of Delaware
Filed May 18, 1964, Ser. No. 368,095
5 Claims. (Cl. 307—88)

ABSTRACT OF THE DISCLOSURE

A magnetic circuit for discriminating between bipolar pulses is disclosed wherein a pulse which goes positive before it goes negative causes an output signal to be produced, but a pulse which goes negative first does not produce an output signal.

---

This invention relates to pulse discriminating circuits and particularly to circuits, employing magnetic cores, that discriminate between bipolar pulses.

The readout of a "bit" from some memory units requires a circuit with the ability to distinguish or discriminate between two bipolar pulses having different configurations in time. The present circuit utilizes magnetic cores and is more stable than other circuits not employing magnetic cores.

It is an object of this invention to provide a novel bipolar pulse discriminator circuit. This and other objects will become apparent upon reading the specification and examining the drawings, wherein:

FIGURE 1 is a schematic diagram of a bipolar pulse discriminator; and

FIGURE 2 illustrates the input and output wave forms.

The schematic diagram of FIGURE 1 discloses a circuit arrangement for a bipolar pulse discriminator.

The circuit arrangement shown comprises cores 10, 12, three windings 14, 16, 18 associated with core 10, three windings 20, 22, 24 associated with core 12, and a junction transistor 26.

Cores 10, 12 are similar, being made of bistable magnetic material. As such, cores 10, 12 each have two possible magnetic states.

Transistor 26 having base 28, emitter 30, and collector 32 is shown in a common emitter configuration. Base 28 is returned to ground 34 through resistor 36, emitter 30 is returned to a negative bias voltage, $-V_1$, through resistor 38, and collector 32 is returned to a positive supply voltage, $+V_2$, through windings 14, 20 connected in series.

Under quiescent condition (no signal input) transistor 26 is biased at an operating point whereby a collector current $I_c$ flows through windings 14, 20. Windings 14, 20 are wound about cores 10, 12 in such a manner that the flux produced in the cores by the current $I_c$ in the windings 14, 20 is in the same direction in each core.

Winding 18 is a bias winding. A constant current supply 40, in series with winding 18, injects current, $I_{BIAS}$, into winding 18 thereby producing flux in opposition to that flux produced by current $I_c$ in winding 14. The current $I_{BIAS}$ being conducted by winding 18 is large enough to cause the magnetic state of core 10 to be opposite to that of core 12 under quiescent conditions.

Windings 16, 24 are connected in series. Whenever the magnetic state of core 10 changes, a voltage is induced in winding 16. The induced voltage in winding 16 produces a current that flows through winding 24, the current in winding 24 producing flux in core 12. Windings 16, 24 therefore, couple cores 10, 12.

Winding 22 on core 12 is an output winding, a voltage being induced in this winding whenever core 12 changes magnetic state.

The input signals are of the type shown in FIGURE 2. The input signal is a bipolar pulse, i.e., the potential of one part of the pulse is positive with respect to ground and the potential of the other part of the pulse is negative with respect to ground. A pulse that goes positive before it goes negative will be called a logical one ("1") and a pulse that goes negative before it goes positive will be called a logical zero ("0").

Assume that a "1" is applied to the base of transistor 26. Accordingly, since the base goes positive with respect to the emitter during the first part of the "1" signal, transistor 26 is forward biased, and the collector current, $I_c$, increases.

Increasing the current $I_c$ will not cause core 12 to switch. However, the increase in $I_c$ will cause core 10 to switch because it was biased in a sense opposite to that of core 12 by the current from supply 40. When core 10 thus changes state, a voltage pulse is induced in winding 16, the induced voltage producing a flow of current in winding 24. Windings 16, 24 are wound around cores 10, 12 and connected together in a manner whereby the current present in winding 24, due to the change of state of core 10 when $I_c$ increases, is in a direction that increases the flux in core 12 in the same sense as that produced by an increasing $I_c$. Thus, during the initial positive potential portion of a "1" input to transistor 26, the magnetic state of core 10 changes but the magnetic state of core 12 does not change.

When the negative potential portion of the "1" input to transistor 26 is reached, $I_c$ rapidly decreases to zero since the transistor is back biased. With $I_c$ equal to zero, the current $I_{BIAS}$ in winding 18 causes the magnetic state of core 10 to change again (back to the state that existed during quiescence). The change of state of core 10 causes a voltage to be induced in winding 16 as before except that the polarity of the induced voltage is opposite to that induced during the positive portion of the "1" input signal. This induced voltage of opposite polarity causes a current to flow in winding 24 thereby creating flux in core 12 in an opposite direction to that then present, until the magnetic state of core 12 changes. A voltage pulse $E_{OUT}$ is induced in winding 22 whenever core 12 changes state.

As the negative portion of the "1" input signal returns to zero, $I_c$, increases until the magnetic state of core 12 switches for the second time.

Hence during a "1" input signal core 10 switches once during the positive portion of the "1" and once during the negative portion, core 12 switches twice during the negative portion.

Understanding the operation during a "1" input it is not difficult to explain the operation during a "0" input.

During the time a "0" input is negative neither core 10 nor core 12 change magnetic state. It is only during the time that a "0" input is positive that core 10 will change magnetic state thereby causing a voltage to be induced in winding 16 which in turn causes a current to flow in winding 24. However, as before, when core 10 changes magnetic state during the time $I_c$ is positive, the resulting current in winding 24 of core 12 causes flux to be produced in core 12 in the same sense as that produced by $I_c$ flowing in coil 20. Therefore the magnetic state of core 12 does not change.

As the potential of the positive portion of the "0" input signal approaches zero the magnetic state of core 10 switches but the current resulting in winding 24 although of the proper sense is not large enough to overcome the effect on core 12 of the current $I_c$ flowing in winding 20 and therefore the magnetic state of core 12 will not change.

Thus, it is observed that during a "0" input signal the magnetic state of core 10 switches twice during the positive portion of the input signal and the magnetic state of core 12 does not change at all during a "0" input signal. Therefore, an output voltage appears across winding 22 only when a "1" input signal is applied to the base of transistor 26 thereby providing means for discriminating between the two general configurations a bipolar pulse may have.

I claim as my invention:

1. A bipolar pulse discriminator comprising:
    first and second magnetic cores each having first, second, and third windings thereon;
    switching means having an input for allowing a first magnitude of current to flow therethrough in the quiescent state, no current to flow therethrough during the time a signal having a first polarity is applied to said input and a second magnitude of current to flow therethrough during the time a signal having a second polarity is applied to said input;
    means including a power source connecting said first winding of said first core, said first winding of said second core, and said switching means, in series with said power source;
    means connecting said second winding of said first core and said second winding of said second core in a series loop;
    means for applying a bias current to said third winding of said first core; and
    means connected to said third winding of said second core having an output signal thereon.

2. A bipolar pulse discriminator comprising:
    first and second cores of magnetic material each having first, second, and third windings thereon;
    switching means having an input for allowing a first magnitude of current to flow therethrough in the quiescent state, no current to flow therethrough during the time a signal having a first polarity is applied to said input and a second magnitude of current to flow therethrough during the time a signal having a second polarity is applied to said input;
    a power source in series connection with said first winding of said first core, said first winding of said second core, and said switching means, all in series;
    means connecting said second winding of said first core and said second winding of said second core in a series loop, said windings being so related on said core that a change of magnetic flux in said first core induces a voltage in said second winding on said first core which causes a current to flow in the second winding on said second core which thereby produces a flux in said second core which is in the same direction as flux produced by a current flowing in the first winding of said second core;
    means for applying a bias current to said third winding of said first core in a direction to produce flux in said first core flowing in opposition to flux produced by a current in said first winding of said first core; and
    means connected to said third winding of said second core having an output signal thereon.

3. A bipolar pulse discriminator comprising:
    first and second cores of magnetic material, each having a first and second magnetic state;
    first, second, and third windings on each of said cores;
    switching means having an input connected to receive bipolar pulses thereon for allowing a first magnitude of current to flow therethrough in the quiescent state, substantially no current to flow therethrough during the time a signal having a first polarity is applied to said input and a second magnitude of current to flow therethrough during the time a signal having a second polarity is applied to said input;
    a power source and means connecting said first winding of said first core, said first winding of said second core, and said switching means, in a series circuit with said power source;
    means for applying to said third winding of said first core a bias current sufficient to maintain said first core in its first state whenever the current flowing through said series circuit is zero or of said first magnitude, said second magnitude of current being sufficient to overcome said bias current and switch said first core to its second state;
    means connecting said second winding of said first core switches from its first state to its second state series, said windings being wound so that said second core remains in the second state when said first core switches from its first state to its ssecond state but said second core switches to its first state when said first core switches from its second state to its first state; and
    means connected to said third winding of said second core for providing an output signal.

4. A discriminator circuit, comprising, in combination:
    a current source, having an input and an output, variable about a predetermined quiescent current value, the variation being dependent upon the magnitude and polarity of a bipolar pulse input signal;
    first and second magnetic cores;
    first, second, and third windings on each core, the first windings on each core connected in series with the output of the current source, whereby corresponding magnetic fields are produced in each core, the second windings on each core connected in series whereby a voltage induced in the second winding on the first core is impressed across the second winding on the second core, whereby the current produced in the second winding on the second core produces a magnetic field aiding the magnetic field produced by the current in the first winding on the second core when the last mentioned current is increasing, the third winding in the second core serving as an output winding; and
    a fixed source of current energizing the third winding on the first core, providing means for biasing the first core.

5. A bipolar pulse discriminator circuit, comprising, in combination:
    an energy source, having an input and an output variable about a predetermined quiescent energy value, the variation being dependent upon the magnitude and polarity of a bipolar pulse input signal;
    first and second magnetic bistable elements;
    first, second, and third windings on each element, the first windings on each element connected in series with the output of the energy source, whereby corresponding magnetic fields are produced in each element, the second windings on each element connected in series whereby energy induced in the second winding on the first element is impressed across the second winding on the second element, whereby the energy produced by the second winding on the second element produces a magnetic field aiding the magnetic field produced by the energy in the first winding on the second element when the last mentioned energy is increasing, the third winding on the second element serving as an output winding; and
    a fixed source of energy connected to the third winding on the first element, providing means for biasing the first element.

References Cited

UNITED STATES PATENTS 2,762,935  9/1956  Shou-Hsien Chow ____ 307—88

JAMES W. MOFFIT, *Primary Examiner.*

U.S. Cl. X.R.

340—174; 329—200